United States Patent [19]

Miles

[11] 3,750,508
[45] Aug. 7, 1973

[54] FOAM PIERCING APPARATUS

[75] Inventor: Thomas R. Miles, Portland, Oreg.

[73] Assignee: Foamat Foods Corp., Corvallis, Oreg.

[22] Filed: Dec. 23, 1971

[21] Appl. No.: 211,271

[52] U.S. Cl. ........................ 83/177, 83/53, 99/485
[51] Int. Cl. .............................................. B26f 3/00
[58] Field of Search ........................... 83/53, 177, 2; 99/485

[56] References Cited
UNITED STATES PATENTS

| | | | |
|---|---|---|---|
| 3,136,649 | 6/1964 | Keahey, Jr. | 83/53 |
| 3,403,712 | 10/1968 | Westling | 83/177 |
| 3,625,813 | 12/1971 | Eckelman | 83/177 |

Primary Examiner—Willie G. Abercrombie
Attorney—Jon M. Dickinson

[57] ABSTRACT

Apparatus for piercing a wet food-substance foam mat to prepare the same for air-circulation drying, where the mat is carried on a traveling perforate conveyor belt. The apparatus includes a plurality of nozzles distributed across the underside of the upper run of the belt having elongated discharge openings that direct laterally overlapping streams of gas upwardly against the belt. The nozzles are mounted for lateral rocking beneath the belt to compensate for transverse waviness in the belt, and are equipped with top rollers that ride against the underside of the belt run-supporting it a predetermined distance from the discharge openings, and operating to sense any such waviness.

24 Claims, 7 Drawing Figures

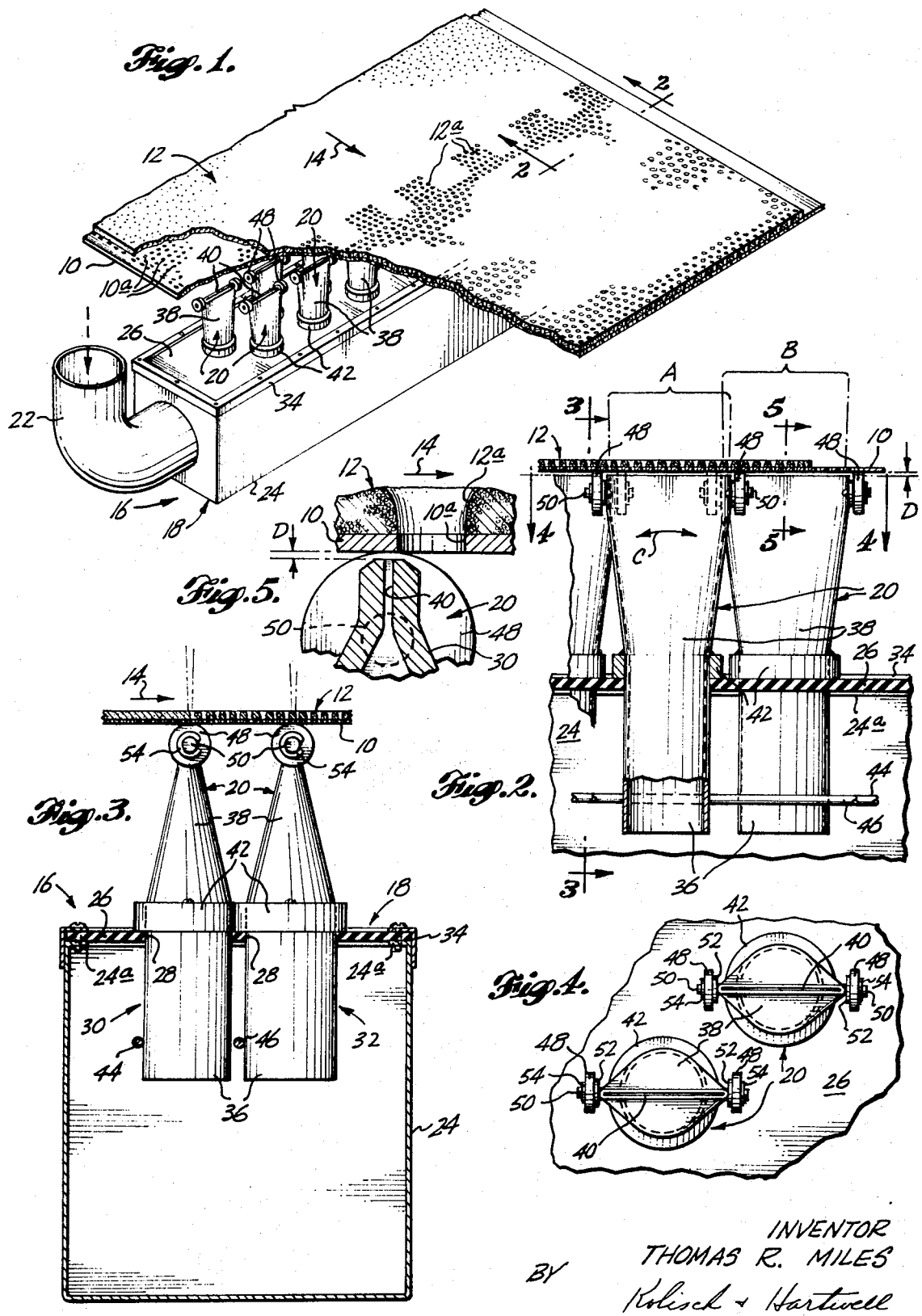

Patented Aug. 7, 1973

INVENTOR
THOMAS R. MILES
BY
Kolisch + Hartwell
ATTORNEY

FOAM PIERCING APPARATUS

BACKGROUND AND SUMMARY OF THE INVENTION

This invention pertains to apparatus for preparing a wet mat of a foam-like material, such as a wet mat of a food-substance foam, for drying. More particularly, it pertains to apparatus for piercing such a mat to produce multiple perforations distributed therein that accommodate air circulation drying of the mat.

One of the important commercial processes today for preparing various types of dehydrated food products includes the preparation of a stable wet foam of a food substance, such as a blueberry foam, the laying out of such a foam in the form of a thin mat on a perforate conveyor belt, and the air circulation drying of such a mat.

A general object of the present invention is to provide novel apparatus for piercing such a wet foam to produce multiple perforations distributed therein for the purpose of facilitating drying of the foam through exposing a relatively large area thereof to circulating air.

More particularly, an object of the invention is to provide such apparatus which is capable of piercing, or perforating, a mat of such a foam in a very uniform and predictable manner, whereby uniform drying of the foam is promoted.

According to a preferred embodiment of the invention, the proposed apparatus contemplates a perforate traveling conveyor belt which supports and carries a mat of foam, with plural gas-ejecting nozzles distributed in a region extending across the underside of the upper run of the belt. Preferably, the perforations in the belt which is employed are closely and relatively uniformly spaced. The upper ends of the nozzles terminate in elongated slot-like discharge openings which are adapted to direct thin, ribbon-like, relatively high velocity streams of gas upwardly against the bottom side of the belt. Such streams flow through the openings in the belt, and pierce any mat thereon (at the locations of the belt openings).

Among the important features in the proposed apparatus which contribute to its ability to produce uniform piercing of mat, are that the nozzles are supported for side-to-side, or lateral, rocking beneath the belt, for vertical movement, and at their upper ends carry belt-engaging means that ride on the underside of the belt. Preferably, the belt-engaging means take the form of rollers journaled adjacent opposite ends of each nozzle discharge opening, which rollers extend a certain predetermined distance above the opening. Such rollers function both to maintain the underside of the belt at substantially this predetermined distance above the discharge openings, and also to transmit to the nozzles any lateral waviness in the belt. The mounting means provided for the nozzles which accommodates lateral rocking thereof, permits a nozzle to rock toward one side or the other to take care of any such waviness in the portion of the belt immediately above the nozzle. The fact that the nozzles can move vertically takes care of any vertical movement in the belt.

This organization, thus, tends to insure that at substantially all times, a stream of air flowing from a nozzle is directed substantially normally (i.e., at substantially a right angle) against the underside of the belt, and from a predetermined distance below the belt. As a consequence, the portions of such streams of air which pass through the openings in the belt to pierce a mat of foam thereon tend to produce like (i.e., uniform) piercing at all points in a mat.

According to the preferred embodiment of the apparatus, the means which accommodates lateral rocking and vertical movement of the nozzles comprises a web of a suitable flexible material which supports the nozzles. This web forms part of a plenum chamber through which gas under pressure is supplied to the inlet sides of the nozzles.

Several modifications of the invention are also proposed—one which features limiting of the upward vertical movement allowed the nozzles, and another which accommodates sleective tilting of the nozzles in vertical planes that extend generally in the same direction as the belt.

DESCRIPTION OF THE DRAWINGS

These and other objects and advantages attained by the invention will become more fully apparent as the description which follows is read in conjunction with the accompanying drawings, wherein:

FIG. 1 is a fragmentary top perspective view illustrating apparatus constructed according to the invention disposed beneath the upper run of a traveling perforate conveyor belt which carries a thin mat of a food-substance foam;

FIG. 2 is an enlarged fragmentary view taken generally along the line 2—2 in FIG. 1 illustrating details of nozzles that form part of the apparatus of FIG. 1;

FIGS. 3 and 4 are views taken generally along the lines 3—3 and 4—4, respectively, in FIG. 2 further illustrating the apparatus of the invnetion;

FIG. 5 is a view, on a larger scale than FIG. 2, taken generally along the line 5—5 in FIG. 2, illustrating the construction of a discharge opening in a nozzle, and showing a perforation made thereby in the foam carried on the belt.

DETAILED DESCRIPTION OF THE INVENTION

Figure 6:
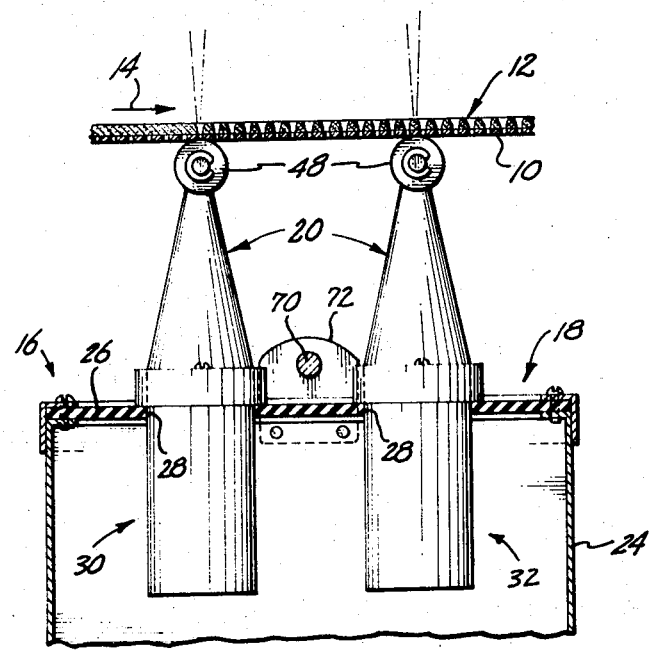
FIGS. 6 and 7 are fragmentary views, each similar to a portion of FIG. 3, illustrating two different modifications of the invention.

Turning now to the drawings, and referring first to FIG. 1, indicated generally at 10 is a portion of the upper run of a traveling perforate conveyor belt on which is supported a thin, flat mat 12 of a food-substance foam, such as a blueberry foam. The conveyor belt shown is a typical stainless steel belt which is suitably driven under power, with its upper run traveling in the direction of arrow 14 in the figure. The particular belt shown has a width of about 31½ inches, a thickness of about 0.032 inches, and includes a central perforated region having a plurality of relatively uniformly spaced circular openings, or perforations, 10a with diameters of about 0.125 inches. The perforated region of the belt is about 40 percent open, has a width of about 30⅝ inches, and is substantially centered relative to the opposite side edges of the belt.

The foam in mat 12 comprises a stable, porous, wet foam which has been prepared in a conventional manner through the mixing of air and a suitable foaming agent with a liquid syrup or concentrate of blueberries. The particular mat illustrated has been extruded (in any suitable manner) onto the conveyor belt, at a point upstream from the portion of the belt shown in FIG. 1, with a thickness of about one-sixteenth of an inch. In accordance with the way in which th mat is formed on the belt, the mat has a predetermined width and lateral positioning on the belt. More specifically, mat 12 has a width of about 29 inches, and preferably is substantially centered laterally on the belt.

Still referring to FIG. 1, indicated generally at 16 beneath belt run 10 is apparatus as contemplated herein for piercing the mat on the belt. Apparatus 16, in general terms, comprises an elongated hollow rectilinear plenum unit 18, and a plurality of nozzles 20 mounted on the top of unit 18. Connected to the near end of unit 18 in FIG. 1 is an inlet conduit 22 which is connected to a source of gas, such as air, under pressure, and which is for supplying such gas to the hollow interior of unit 18.

Considering now the construction of apparatus 16 in greater detail, and referring to FIGS. 1–3 together, plenum unit 18 comprises an elongated rectilinear box 24 having an inturned upper rectangular flange 24a (see FIG. 3). Previously-mentioned inlet conduit 22 is suitably joined to the end of box shown in FIG. 1, and communicates with the interior of the box through a suitable opening provided in such end.

Seated on top of flange 24a, and forming a top for the box is an elongated flat web 26. As contemplated herein, and for reasons which will be more fully explained later, web 26 is formed from a suitable flexible sanitizable material, such as rubber. Web 26 is provided with a plurality of circular openings 28 which are distributed in two elongated substantially parallel rows, indicated generally at 30, 32 in FIG. 3, which extend along the web. In the particular construction of web 26 illustrated, row 30 contains eight openings 28, and row 32 contains seven such openings. The openings in row 30 are staggered with respect to the openings in row 32. Web 26 is held in place on flange 24a by means of a rectangular angle-iron clamp 34 which is screwed to the flange.

The plenum unit is disposed with its longitudinal axis substantially parallel to the plane of belt run 10, and at substantially a right angle to the direction of belt travel.

Nozzles 20 are substantially the same as one another in construction. Each nozzle comprises a lower and an upper elongated hollow tube 36, 38, respectively, which are axially aligned and suitably joined. Each lower tube 36 has substantially a cylindrical configuration, with an outside diameter about the same as the inside diameter of openings 28 in belt 26. Upper tubes 38 are circular in cross section adjacent their bottom ends (with cross-sectional dimensions substantially the same as those of tubes 36), and are flattened at their upper ends, as shown, to form elongated slot-like discharge openings 40. In the embodiment being described, each discharge opening 40 has a length of about 2⅛ inches, and a width of about 0.02 inches. Suitably fastened to the outsides of the upper ends of tubes 36 are annular collars 42.

Nozzles 20 are mounted and supported on web 26, with tubes 36 in the nozzles extending down through openings 28 in the web, and with collars 42 seating on top of the web. Web 26 thus constitutes a mounting means for the nozzles. The nozzles are oriented in such a way that the longitudinal axes of discharge openings 40 are disposed substantially parallel to the longitudinal axis of unit 18 (i.e., at substantially right angles to the direction of belt travel). With apparatus 16 viewed along a line paralleling the direction of belt travel, as in FIG. 2, the ends of openings 40 overlap one another. The outer ends of openings 40 in the laterally outermost nozzles in row 30 are spaced apart about 30 inches. The discharge openings of the nozzles thus span a distance which is somewhat greater than the width of mat 12. And the array of nozzles is substantially laterally centered under belt run 10.

Referring particularly to FIGS. 2 and 3, suitably mounted on and extending longitudinally between the ends of box 24 is a pair of elongated spaced-apart bars 44, 46. Bar 44 is disposed immediately to the left in FIG. 3 of the lower tubes in the nozzles in row 30, and engages these tubes. Similarly, bar 46 is disposed immediately to the left in FIG. 3 of the lower tubes in the nozzles in row 32, and engages these tubes. The functions of bars 44, 46 will be explained more fully later.

Mounted adjacent the upper ends of nozzles 20, as contemplated herein, are pairs of coaxial rollers, or belt-engaging means, 48. More specifically, and considering the pair of rollers provided for a given nozzle, these rollers preferably are formed from a suitable high-coefficient-of-friction material, such as a hard acetal material. The rollers preferably are supported on friction-reducing bushings, such as teflon bushings (concealed), which in turn ride on axially aligned laterally projecting pins 50 that are joined to tubes 38 adjacent the opposite ends of a discharge opening 40. The rollers are separated from the sides of the tubes by means of washers 52 which are mounted on the pins, and are held in place on the pins by means of snap rings 54.

In the particular embodiment being described, rollers 48 have outside diameters of about 1 inch, and project about 0.01 inches above the discharge openings in the nozzles. These rollers ride on the underside of belt run 10.

Explaining now how the equipment described herein performs, the foam in mat 12, upstream from apparatus 16, is a homogeneous wet, porous, but nonperforate mass. Typically, it is being transported on the belt to a suitable hot gas dryer (not illustrated) which circulates heated gas, such as heated air, about the mat for the purpose of dehydrating it. As has been mentioned earlier herein, it is preferable that dehydration of the mat be uniformly and quickly accomplished in such a dryer. As will now be explained, apparatus 16, which is disposed upstream from such a dryer, promotes such uniform and speedy drying through piercing the foam on the belt.

Inlet conduit 22 is connected to a source of gas, such as air, under pressure. Such a pressure typically is in the range of about 0.3 to 1.0 pounds-per-square-inch. Such gas is distrubuted uniformly in plenum unit 18 to the different nozzles, which eject it as high velocity streams against the underside of belt run 10. More specifically, such gas streams flow from the discharge openings in the nozzles at velocities in the range of about 3,000 to about 5,000 feet-per-minute. With the discharge openings of the nozzles configured as described, these streams take the form of relatively thin, wide ribbons of gas. And, because of the fact (mentioned earlier) that the ends of the discharge openings of the nozzles laterally overlap one another (as such are viewed in the direction that belt run 10 travels), the streams of gas flowing from the discharge openings also so overlap. This feature is illustrated in FIG. 2 where the edges of gas streams flowing from the central and right nozzles in the figure are illustrated in dash-dot outline and in dash-triple-dot outline, respectively, and are bracketed at A and B respectively.

As a consequence, as the nonpierced portion of mat 12 travels over apparatus 16, it is subjected, across its entire width, to multiple high velocity streams of air which flow through the perforations in the belt, and which puncture or pierce the foam to leave perforations, such as perforations 12a, therein. Because of the particular arrangement of nozzles contemplated herein, the line of demarcation between pierced and nonpierced foam has the somewhat squared serpentine outline illustrated in FIG. 1. The configuration of an individual perforation 12a is illustrated in FIG. 5. The perforation, adjacent its base in the figure, has a cross-sectional outline substantially matching that of a perforation 10a in belt run 10. Perforation 12a, however, flares out somewhat adjacent its upper end.

In order for piercing of the foam to be uniform (which is desirable if a uniform product is to result), it is important that each stream of air flowing through a perforation in belt run 10 flow therethrough with substantially the same velocity and at substantially the same relative angle as those for all the other streams of air flowing through the belt. And, in order to accomplish this desirable objective, it is important that a substantially uniform spacing be maintained between all of the nozzles' discharge openings and the underside of the belt immediately thereabove. The novel mounting means provided for nozzles 20, and the novel belt-engaging rollers mounted on the nozzles, enable this type of performance.

More specifically, and considering one of their functions, the rollers which ride on the underside of the belt run support it at a predetermined distance (D in FIGS. 2 and 5) above the various discharge openings. A distance of about 0.01 inches, which is maintained by the apparatus shown herein, has been found to be satisfactory for piercing a foam such as foam 12. Apparatus 16 may, of course, be so positioned beneath the upper belt run that this run tends to rest and ride on the rollers to assure this result.

Another function of the rollers is to sense any lateral waviness in the belt (such waviness being a common phenomenon in a belt of the type described herein). On sensing such waviness, they transmit a force to their associated nozzle--tending to rock it laterally in a direction which tends to keep both rollers in the pair in contact with the belt. Such rocking can occur as indicated by double-headed curved arrow C in FIG. 2. Flexible web 26 accommodates such rocking of a nozzle—to accommodate the particular degree of waviness encountered. Under most operating circumstances, waviness in the belt may cause lateral rocking of a nozzle up to about 2° in either direction. Web 26 accommodates a considerably wider range of rocking should such be necessary. It will be appreciated that this kind of action permits the various gas streams that flow from the nozzles to pierce different portions of mat 12 at substantially the same relative angles. Such action obviously could not be obtained in a single wide nozzle spanning the same distance as the multiple nozzles disclosed herein.

Bars 44, 46 provide a reaction force for the nozzles which inhibits undesirable forward rocking (in the direction that the belt travels) due to engagement of rollers 48 and the belt.

The discharge openings of the nozzles are thus maintained at substantially the same uniform distances from the underside of belt run 10, and are automatically oriented at a proper angle, laterally, to direct their respective streams of gas substantially normal to the underside of the belt. As a consequence, the streams of gas which flow through the perforations in the belt (from the different nozzles) tend to flow therethrough at substantially the same velocities and angles relative to the belt. And the result of this performance is that the mat of foam is pierced in a very uniform manner.

With the mat pierced, it will be appreciated that a relatively large surface area thereof is thus exposed for contact with air circulating in a dryer such as the one mentioned earlier. This, of course, considerably speeds a drying operation.

Referring now to FIG. 6, which shows one modification of the invention, here the two rows of nozzles are separated (as viewed from an end of unit 18) to provide clearance for elongated bar 70. Bar 70 extends completely along and over and substantially parallel to the top of web 26, with its opposite ends mounted through brackets 72 on the ends of unit 18. In the particular arrangement illustrated, bar 70 is disposed about one-fourth inch above the top of the web with the web flat.

With air supplied the plenum unit, web 26, which bulges upwardly, is limited by engagement with bar 70. Such an arrangement has been found to be desirable in certain applications where vertical travel-limiting and travel-equalizing in the nozzles are desired.

Figure 7:
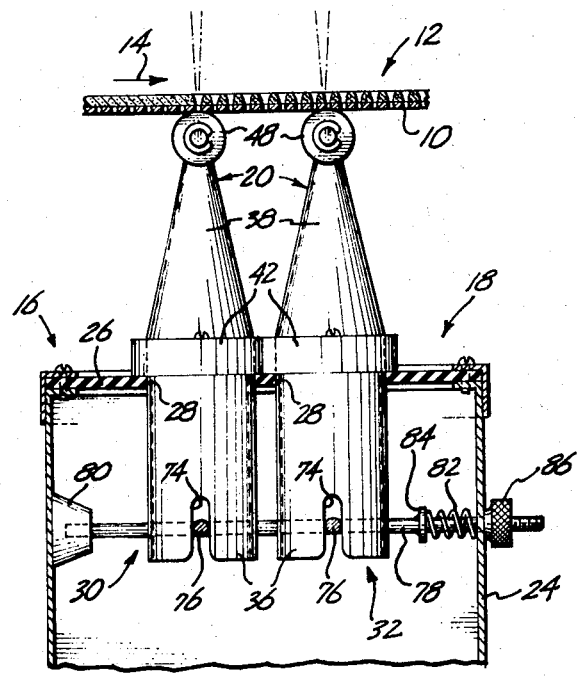

The modification shown in FIG. 7 is employable with either of the constructions so far described. For illustration purposes, it is shown incorporated with the first-described construction.

According to this modification, slots 74 are provided in the bottom ends of the nozzles, which slots, in each row of nozzles, are aligned to accommodate elongated bars 76. Bars 44, 46 are omitted. Bars 76 are supported on and suitably joined to adjuster bars, such as bar 78, whose left ends in FIG. 7 are slidably supported on guides, such as guide 80. The right ends of bars 78 in the figure are threaded and extend through suitable accommodating bores in the wall of box 24. Mounted on the right ends of these bars are biasing springs, such as spring 82, which act between box 24 and retainers, such as retainer 84, joined to the bars. An adjusting knob, such as knob 86, is screwed onto the bars as shown.

It will be apparent that bars 76 limit both rocking and twisting of the nozzles. In addition, it will be noted that through turning of knobs 86, bars 76 can be shifted to tilt the nozzles a limited amount to adjust the directions of air streams. In certain drying applications, the ability to make such an adjustment has been found to be desirable.

While a preferred embodiment, and several modifications, of the invention have been described herein, it is appreciated that variations and other modifications may be made without departing from its spirit.

It is claimed and desired to secure by Letters Patent:
1. Apparatus for piercing a wet foam-like mat which is supported on a traveling perforate conveyor belt, said apparatus comprising a nozzle adapted to be connected to a source of gas under pressure, said nozzle having an elongated slot-like discharge opening, mounting means mounting said nozzle beneath said belt with said discharge opening oriented to direct gas upwardly against the underside of said belt, and with the longitudinal axis of said discharge opening disposed at an angle relative to the direction of belt travel, and belt-engaging means mounted on said nozzle and extending a certain distance above said discharge opening for engaging the underside of the belt, said belt-engaging means tending to maintain the spacing between said discharge opening and the underside of said belt at said certain distance.

2. The apparatus of claim 1, wherein said belt-engaging means comprises a roller.

3. The apparatus of claim 1, wherein said belt-engaging means comprises a pair of spaced-apart substantailly coaxial rollers journaled adjacent opposite ends of said discharge opening.

4. The apparatus of claim 1, wherein said mounting means includes means permitting selective tilting of said nozzle in a generally upright plane which extends generally in the direction of belt travel.

5. The apparatus of claim 1, wherein said mounting means includes means accommodating lateral rocking of said nozzle in a generally upright plane which is disposed transversely of the direction of belt travel.

6. The apparatus of claim 5, wherein the means accommodating lateral rocking of said nozzle comprises a flexible web supporting the same.

7. The apparatus of claim 1, wherein the longitudinal axis of said discharge opening is at substantially a right angle to the direction of belt travel, said belt-engaging means comprises a pair of spaced-apart coaxial rollers journaled adjacent opposite ends of said discharge opening for turning about an axis substantially paralleling said longitudinal axis, and said mounting means includes means accommodating lateral rocking of said nozzle in a generally upright plane containing said axes.

8. The apparatus of claim 7, wherein the means accommodating lateral rocking of said nozzle comprises a flexible web supporting the same.

9. Apparatus for piercing a wet foam-like mat comprising a traveling perforate conveyor belt for supporting such a mat, a nozzle adapted to be connected to a source of gas under pressure, said nozzle having an elongated slot-like discharge opening, mounting means mounting said nozzle beneath said belt with said discharge opening oriented to direct gas upwardly against the underside of said belt, and with the longitudinal axis of said discharge opening disposed at an angle relative to the direction of belt travel, and belt-engaging means mounted on said nozzle and extending a certain distance above said discharge opening for engaging the underside of the belt thereabove, said belt-engaging means tending to maintain the spacing between said discharge opening and the underside of said belt at said certain distance.

10. The apparatus of claim 9, wherein said belt-engaging means comprises a roller journaled for rotation about a journal axis which is at substantially a right angle to the direction of belt travel.

11. The apparatus of claim 9, wherein said belt-engaging means comprises a pair of spaced-apart coaxial rollers journaled adjacent opposite ends of said discharge opening for rotation about a journal axis which is at substantially a right angle to the direction of belt travel.

12. The apparatus of claim 9, wherein said mounting means includes means permitting selective tilting of said nozzle in a generally upright plane which extends generally in the direction of belt travel.

13. The apparatus of claim 9, wherein said mounting means includes means accommodating lateral rocking of said nozzle in a generally upright plane which is disposed transversely of the the direction of belt travel.

14. The apparatus of claim 13, wherein the means accommodating lateral rocking of said nozzle comprises a flexible web supporting the same.

15. The apparatus of claim 9, wherein the longitudinal axis of said discharge opening is at substantially a right angle to the direction of belt travel, said belt-engaging means comprises a pair of spaced-apart coaxial rollers journaled adjacent opposite ends of said discharge opening for turning about a journal axis which is substantially parallel to said longitudinal axis, and said mounting means includes means accommodating lateral rocking of said nozzle in a generally upright plane which contains said longitudinal and journal axes.

16. The apparatus of claim 15, wherein the means accommodating lateral rocking of said nozzle comprise a flexible web supporting the same.

17. Apparatus for piercing a wet foam-like mat which is supported on a traveling perforate belt, and which has a certain width and lateral position on the belt, said apparatus comprising a plurality of nozzles each adapted to be connected to a source of gas under pressure and each having an elongated slot-like discharge opening whose length is less than said certain width of a mat, mounting means mounting said nozzles in a region beneath said belt, with said discharge openings oriented to direct gas upwardly against the underside of said belt, and with the longitudinal axes of said discharge openings extending at angles to the direction of belt travel, said discharge openings when viewed generally in the direction that the belt travels overlapping one another, and collectively spanning a distance, measured transversely of the belt, which at least equals said certain width of a mat and which is substantially laterally centered relative to the certain lateral position of a mat on the belt, and for each nozzle, belt-engaging means mounted thereon and extending a certain distance above its said discharge opening for engaging the underside of the belt thereabove, each of said belt-engaging means tending to maintain the spacing between its associated discharge opening and the underside of said belt at said certain distance.

18. The apparatus of claim 17, wherein each belt-engaging means comprises a roller journaled for rotation about a journal axis which is at substantially a right angle to the direction of belt travel.

19. The apparatus of claim 17, wherein each belt-engaging means comprises a pair of spaced-apart coaxial rollers journaled adjacent opposite ends of a discharge opening for rotation about a journal axis which is at substantially a right angle to the direction of belt travel.

20. The apparatus of claim 17, wherein said mounting means includes means permitting selective tilting of said nozzles in generally upright planes which extend generally in the direction of belt travel.

21. The apparatus of claim 17, wherein said mounting means includes means accommodating lateral rocking of said nozzles in generally upright planes which are disposed transversely of the direction of belt travel.

22. The apparatus of claim 21, wherein the means accommodating lateral rocking of the nozzles comprises an elongated flexible web extending beneath and transversely of said belt and supporting said nozzles.

23. The apparatus of claim 17, wherein the longitudinal axes of said discharge openings generally parallel one another and are disposed at substantially right angles to the direction of belt travel, each belt-engaging means comprises a pair of spaced-apart coaxial rollers journaled adjacent opposite ends of a discharge opening for rotation about a journal axis substantially paralleling the longitudinal axis of the discharge opening, and said mounting means includes means accommodating lateral rocking of said nozzles in generally upright planes which contain said longitudinal and journal axes.

24. The apparatus of claim 23, wherein the means accommodating lateral rocking of said nozzles comprises an elongated flexible web extending beneath and transversely of said belt and supporting said nozzles.

* * * * *